(No Model.)
M. F. HENDERSON.
BICYCLE SADDLE.
No. 572,163. Patented Dec. 1, 1896.
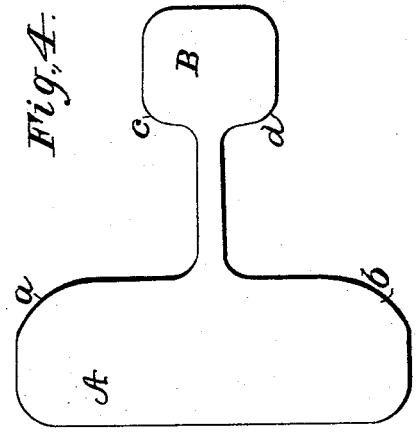
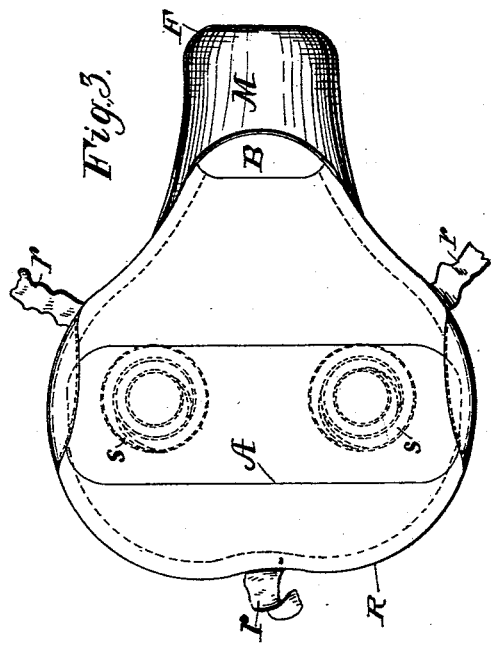
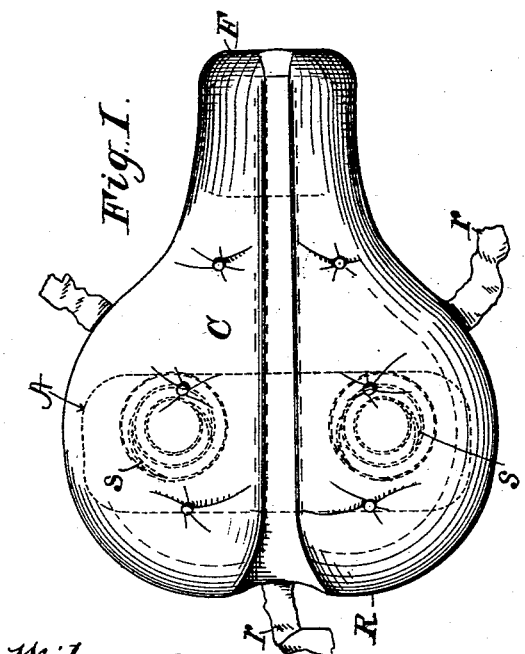
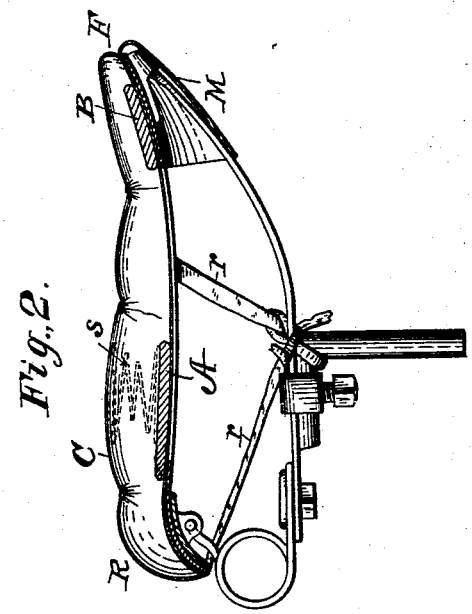
Witnesses.
Inventor.
Mary Foster Henderson
by Pollok & Mauro
her attorneys.

UNITED STATES PATENT OFFICE.

MARY FOOTE HENDERSON, OF WASHINGTON, DISTRICT OF COLUMBIA.

BICYCLE-SADDLE.

SPECIFICATION forming part of Letters Patent No. 572,163, dated December 1, 1896.

Application filed May 18, 1896. Serial No. 591,972. (No model.)

*To all whom it may concern:*

Be it known that I, MARY FOOTE HENDERSON, of Washington, District of Columbia, have invented a new and useful Improvement in Bicycle-Saddles, which is fully set forth in the following specification.

This invention relates to bicycle-saddles, and will be understood by reference to the accompanying drawings, forming part of this specification, wherein—

Figure 1 is a top plan view of the device which is the subject-matter of this invention. Fig. 2 is a longitudinal section, partly in elevation. Fig. 3 is a bottom plan view, and Fig. 4 is an outline view of the frame.

Most, if not all, persons who have been in the habit of using bicycles have experienced inconveniences of a more or less serious character, which resulted in some cases in physical injury, in many cases in excessive fatigue, and in nearly all in local pains of a more or less passing nature. Having devoted a great deal of thought and study to this subject, I have been able to determine the causes of such inconveniences and devise a means of remedying the same.

The causes, it may be said in a general way, are due to the shape of the saddles such as are now in common use, made from an unanatomical and unhygienic point of view, to the hardness of the material of which they are made, and the unyielding and inflexible character of the parts which come into frictional contact with the body of the rider when propelling the wheel.

The problem which I sought to solve was to afford a remedy without involving the necessity of absolute change of the structure of the saddle, which, in view of the many thousands in actual use, would entail an expense or loss in changing the saddle and adopting an entirely new one; and to this end I have devised an attachment adaptable to any kind of saddle in existence or to be created hereafter, consisting, essentially, in a suitably-padded saddle-covering appliance of peculiar construction and arrangement, which enables it to be adapted or fitted to any saddle and removes from it the objectionable features heretofore indicated.

To enable others skilled in the art to make my said invention, I shall now proceed to describe its construction.

To a stiff or slightly elastic cross-bar A, of a length somewhat in excess of the greatest width of ordinary saddles at the rear part of the same, is fastened at the ends thereof a padded seat or cushion C, of the shape of a flattened pear, *i. e.*, with an enlarged rear R and contracted front F. Another cross-bar B is attached to the front F, so as to give the point or part corresponding to the horn a certain rigidity and hold the two side cushions at F erect and in place, so that the hard substance in the middle may be avoided. A wire band may also be inserted to maintain the shape of the front cushion. The two cross-bars A and B, thus forming the base or supports to the cushion or padded seat, are held in their respective positions by the cushion itself, to which they may be secured by upholstering-tacks, if made of wood, or by being sewed on to an envelop of leather or other material inclosing the same, or by means of a connecting-bar, or in any other way that may be deemed preferable. I also propose to make the two cross-bars with a connecting-bar in the form of a frame of corrugated sheet metal that can be struck up in one piece somewhat in the form shown in Fig. 4, with rounded ends at $a$, $b$, $c$, and $d$. This frame may be of skeleton form or may be made of stiff wire.

The cushion may form a pocket in which the frame may be slipped and securely held therein. In the construction of the cushion or padded seat special care should be taken to so shape it, distribute the padding material therein, and fasten the same to a solid base, made of leather or other somewhat stiffer or resisting, but flexible, material, as to afford the greatest comfort consistent with safety in balance and support in case of sudden stoppage. To this end the padding should have a centrally longitudinal depression and extend and lap over the cross-bar or frame at the rounded parts $a\ b\ c\ d$, so that the thighs in their motion shall meet with no hard resisting portion. I also insert in the seat corresponding to the ischiums double-taper volute springs $s$, or springs of any suitable shape strengthened or not with a padding of horsehair or other flexible or elastic material, to increase the comfort of the rider when used for any prolonged period of time. Instead of horsehair or other equivalent stuffing the cushion may be made of an impervious material and inflated with air or composed of rubber or rubber tubing embedded in horsehair or wool, &c.

To the under side of the cushion, at the front end thereof, I attach a cap M, made of leather or other suitable substance, of such shape and dimensions as to fit the horn of the bicycle-saddle by being slipped over it like an inverted slipper.

To the rear and at the sides of the cushion are secured straps or ribbons $r$, by means of which the cushion, after being slipped onto the horn and covering the saddle, may be fastened to any convenient part of the bicycle, such as the post, and thus be securely held in place and incapable of slipping in any direction.

Instead of straps any other fastening device may be used, which, being mere mechanical expedients, need no special description and will suggest themselves to any competent mechanic.

It will be understood that this cushion can be used with any existing bicycle-saddle, for when applied and properly secured it will assume the general and desirable shape of the saddle without exposing the user to the contact with the hard injurious portion of the same.

I have described my invention as an attachment to ordinary bicycle-saddles, but it will be readily understood that with obvious modification it may be applied to the manufacture of regular bicycle-saddles.

Having thus described my invention, what I claim as new, and desire to secure by Letters Patent, is—

1. A bicycle attachment consisting of a padded seat with a double cross-bar and means for applying and securing the same to the saddle, substantially as herein set forth.

2. A bicycle-saddle consisting of a supporting-piece composed of transverse bars held at such distance apart by a central longitudinal bar as to afford between them free play to the legs of the rider, and a cushion covering the supporting-piece on the top and the sides, substantially as shown and described.

In testimony whereof I have signed this specification in the presence of two subscribing witnesses.

MARY FOOTE HENDERSON.

Witnesses:
REEVE LEWIS,
A. POLLOK.